United States Patent
Baier et al.

(10) Patent No.: US 9,587,729 B2
(45) Date of Patent: Mar. 7, 2017

(54) PRESS CONNECTION WITH A SLEEVE-LIKE COMPONENT OF SHEET METAL

(75) Inventors: Richard Baier, Aurachtal (DE); Andreas Ziegler, Nuremberg (DE); Otmar Weber, Pommersfelden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1152 days.

(21) Appl. No.: 12/859,520

(22) Filed: Aug. 19, 2010

(65) Prior Publication Data
US 2011/0109083 A1 May 12, 2011

(30) Foreign Application Priority Data
Nov. 12, 2009 (DE) .................. 10 2009 052 759

(51) Int. Cl.
| F16H 57/04 | (2010.01) |
| F16B 4/00 | (2006.01) |
| F16D 1/06 | (2006.01) |
| F16C 33/58 | (2006.01) |
| F16D 1/08 | (2006.01) |

(52) U.S. Cl.
CPC .......... *F16H 57/0426* (2013.01); *F16B 4/004* (2013.01); *F16D 1/06* (2013.01); *F16C 33/588* (2013.01); *F16C 2361/61* (2013.01); *F16D 1/0858* (2013.01); *F16D 2300/06* (2013.01); *F16D 2300/08* (2013.01); *Y10T 403/7039* (2015.01)

(58) Field of Classification Search
CPC .............................. F16L 27/08; F16L 27/0816
USPC .... 285/125.1, 133.6, 351, 923, 133.21, 370, 285/397, 425, 273, 382.4, 382.5, 275
See application file for complete search history.

(56) References Cited

U.S. PATENT DOCUMENTS

| 1,797,691 A * | 3/1931 | Merrill ...................... 285/382.2 |
| 2,701,146 A * | 2/1955 | Warren .................. F16L 39/04 285/275 |
| 2,849,244 A * | 8/1958 | Sampson .............. B23B 31/302 285/275 |
| 3,001,804 A * | 9/1961 | Tomlinson et al. ...... 285/137.11 |
| 3,129,960 A * | 4/1964 | Schrodt ............... F16L 27/0828 285/275 |
| 3,833,277 A | 9/1974 | Jones et al. |
| 3,971,573 A * | 7/1976 | Clements ......................... 285/5 |
| 4,390,303 A * | 6/1983 | Mallet ........................... 403/284 |
| 5,009,523 A | 4/1991 | Folger et al. |
| 5,072,655 A | 12/1991 | Adler |
| 9,303,799 B2 * | 4/2016 | Tseng .................. F16L 13/0227 |
| 2009/0052821 A1 | 2/2009 | Hartmann |

(Continued)

FOREIGN PATENT DOCUMENTS

| DE | 2836729 | 3/1979 |
| DE | 3105392 | 9/1982 |

(Continued)

*Primary Examiner* — David E Bochna
(74) *Attorney, Agent, or Firm* — Simpson & Simpson, PLLC

(57) ABSTRACT

A press connection which includes a carrier and at least one sleeve-shaped structural component of sheet metal seated at least with a press seat on the carrier. At least one indentation is formed on the surface of the carrier and the indentation is at least covered by at least one wall section of the sleeve-shaped structural component.

19 Claims, 3 Drawing Sheets

(56) References Cited

U.S. PATENT DOCUMENTS

2012/0025520 A1\* 2/2012 Xu ........................ E03C 1/0404
285/275

FOREIGN PATENT DOCUMENTS

| DE | 4238147 | 5/1994 |
| DE | 4238147 A1 | 5/1994 |
| DE | 10 2007 048 124 A1 | 4/2009 |
| DE | 102007046527 | 4/2009 |
| EP | 0716238 | 6/1996 |

\* cited by examiner

PRESS CONNECTION WITH A SLEEVE-LIKE COMPONENT OF SHEET METAL

This application claims the priority of DE 10 2009 052 759.1 filed Nov. 12, 2009, which is incorporated by reference herein.

FIELD OF THE INVENTION

The invention relates to a press connection composed of a carrier and at least one sleeve-shaped component of sheet metal which is seated with a press fit on the carrier, wherein at least one indentation is formed on the surface of the carrier, wherein the indentation is at least covered by at least one wall portion of the sleeve-shaped component. The invention also relates to a sleeve-shaped structural component of the press connection and a media guide in a gear unit in which a press connection is provided between the carrier and the structural component.

BACKGROUND OF THE INVENTION

Press connections of this type are used between massive carriers and the thin-walled structural components of sheet metal everywhere in machine and automobile building, where there are requirements with respect to low structural height and light-weight construction. The quality of the surface of the structural components of sheet metal is very high, so that chip-removing refinishing operations are not necessary. This has an advantageous effect on the cost of manufacturing.

Examples for uses are bearing rings for needle or roller bearings which are drawn of sheet metal and which can be used without performing a refinishing operation of the rolling surfaces. Further examples are sealing surfaces which are formed by the surface of sleeves after drawing.

As a result of the connection of carrier and sleeve, for example, ducts of media guides are formed. For this purpose, grooves in the surface of carriers are covered by means of the thin-walled structural component, so that laterally delimited ducts are formed on all sides. As a result of this type of arrangement, the complex drilling of, in particular, long lubricating ducts in shafts is avoided.

Bearing rings of radial bearings and sealing sleeves are, as already mentioned, sleeve-shaped, thin-walled structural components of sheet metal by way of the thin walls of which the radial structural height can advantageously be kept as small as possible. Such thin-walled structural components are preferably manufactured inexpensively by cold forming, especially by deep drawing of sheet metal. Thin-walled bearing rings are frequently comparatively non-round as individual components. Therefore, they must be pressed into or onto the bearing seat of the carrier in order to assume the roundness required for roller bearings. In addition, the optimum radial bearing play and the fixed seat of the respective bearing ring are achieved with the press fit.

The respective cylindrical seat for the bearing ring or for the sealing sleeve is achieved by way of functional indentations or indentations caused by manufacturing requirements on the surface of the carrier which are formed, for example, by openings of guides and ducts for liquid or gaseous media or any other recess-like indentation. The pressing forces required for the press fit are relatively high, so that during pressing in of the rings they have the tendency to be upset and to yield radially into the indentations. As a result, the rings deform non-round especially at the indentations.

The sheet metal of the wall sections with which the groove-like or opening-like indentations are covered yields because of the lacking radial support in the area of the indentations during pressing in radially outwardly and during pressing on radially inwardly into the indentations. In addition, the structural components are shrunk into the indentations because of the tensions of the press fit. The contours of the ducts are formed in such a way that non-roundness and other undesirable deviations of shape can occur and, as a result, the piston travel and sealing surfaces become non-round and untight and the rolling surfaces become imprecise.

Therefore, in these arrangements a press fit of the sleeve-shaped structural components with the respective carrier is frequently omitted. Consequently, the non-roundness occurring in the bearing and in the sealing seats and greater operational plays are accepted. The structural components are then secured, for example, by lugs at the appropriate seats.

Thin-walled sleeves are used, for example, as sealing sleeves in gear units with shaft systems which are interlaced, such as in torque converter transmissions or double clutch transmissions. These sleeves seal oil-conducting structures, close openings due to manufacturing requirements, or are used for the targeted supply of lubrication oil. Such sleeves are frequently pressed into cylindrical bores of hollow shafts. It is in this field that the expert is confronted with the above-described problems. In the area of the indentations, deformations and surface defects, at the sealing seats for example, are formed which may lead to losses due to leakages in these media guides.

DE 42 38 147 A1 shows such media guides in an automatic gear unit which are delimited by bearing rings of two roller bearings and are formed at the surroundings thereof. The respective oil guide leads pressure oil to a respective piston cylinder unit of a hydraulically actuatable coupling. As a result of the presence of the roller bearings, a hollow-cylindrical shaft portion of a planetary drive referred to as the carrier of the sleeve-shaped structural component is rotatably mounted in housing sections of the hydraulic couplings of the automatic gear unit.

The first roller bearing has an inner bearing ring and an outer bearing ring, wherein the bearing rings are both formed as hollow-cylindrical sleeve-shaped structural components between which the rolling bodies roll on rolling surfaces. The carrier for the inner bearing ring is a hollow cylindrical section of the housing of the first piston cylinder unit of one of the hydraulically actuated couplings. The carrier for the outer bearing ring is a shaft section in the inner cylindrical hole of which the bearing ring is seated and is rotatable together with the latter about an axis of rotation.

The second roller bearing has an inner and an outer bearing ring with raceways for the rolling bodies which are both sleeve-shaped structural components. The carrier for the inner bearing, which carrier is rotatable about the axis of rotation, is the cylindrical shaft section of the planetary drive. The carrier for the outer bearing ring is a housing of the second piston cylinder unit of one of the hydraulically actuated couplings in the bore of which it is seated.

The inner and outer bearing rings are also constructed as sealing sleeves and oil guiding elements and have additionally sealing surfaces and the rolling surfaces for rolling bodies. Pressure oil is initially conducted to the outer bearing ring of the first roller bearing and to the inner bearing ring of the second roller bearing via ducts in the hollow-cylindrical shaft section. The ducts are located at the outer bearing ring of the first roller bearing and at the inner bearing ring of the second roller bearing.

The outer bearing ring of the first roller bearing has a radial throughopening which is in communication in a manner permeable to oil with one of the ducts of the first oil guide. Through this throughopening, oil can flow from the duct into the interior of the first bearing to the inner bearing ring. The inner bearing ring also has a radial throughopening which is in communication in an oil-permeable manner with a further duct of the first oil guide to the first piston-cylinder unit.

The inner bearing ring of the second roller bearing closes the duct of the first oil guide so that no oil can penetrate from the first oil guide into the second roller bearing. However, the inner bearing ring of the second roller bearing has a radial throughopening which is in communication in an oil-permeable manner with a duct of the second oil guide. In addition, the outer bearing ring of the second roller bearing has a radial throughopening which is in communication in an oil-permeable manner with a further duct of the second oil guide which leads to the second piston-cylinder unit.

The first roller bearing and the second roller bearing are each sealed laterally relative to the surroundings, so that hardly any pressure oil can escape from the respective roller bearing to the surroundings. For this purpose, the outer bearing ring of the respective roller bearing has sealing surfaces against which a respective sealing ring rests.

SUMMARY OF THE INVENTION

It is therefore the object of the invention to provide a press connection, media guides and sleeves for such press connections and media guides by means of which the above-described problems can be avoided.

The invention relates to press connections in all fields of machine and automobile construction in which the accuracy of the press fits of thin-walled sleeve-like structural components are influenced by indentations at the surface of carrier members. The invention also relates to media guides in any type of machine of industry and particularly in automobile gear units. Media guides are in the widest sense understood to be all ducts and holes which are suitable for conducting, permitting to pass or to receive pressureless or pressurized media such as air or oil. The invention also relates to the sleeve-shaped structural components for the above-described press connections.

The press connection is formed between the carrier and at least one single-piece or composite sleeve-like structural component of any shape and with any cross-section and dimensions. However, the sleeve-shaped structural component is preferably a cylindrically constructed sleeve.

Carriers are any structural components in or on whose surface one or more structural components are seated. Carriers are, for example, shafts, hollow shafts, shaft stubs and other rotationally symmetrical structural components. The carriers are preferably of steel or of aluminum and their alloys.

The sleeve-like structural component is seated in or on a carrier. At least one indentation is formed in the form of a groove or a throughhole or blind end-hole on the carrier. The duct may be, for example, a groove on the surface in a bore or in the outer layer, which groove extends in alignment with the longitudinal axis of the carrier or at any inclination relative thereto. Also conceivable is an annular groove around the axis of rotation of a rotationally symmetrical carrier. Alternatively, the duct is formed by an indentation or a transverse bore. A duct is created between the carrier and the sleeve-shaped structural component by at least partially covering a groove or a hole at the surface of the carrier by the sleeve-shaped structural component.

The sleeve-shaped structural component and the carrier are seated with a press seat against each other at least at the vicinity of the duct. The thickness of the sheet metal of the wall section with which the duct is covered has a greater thickness than the thickness of the sheet metal of the sleeve which is located directly adjacent the wall section in at least one direction and with which the sleeve-shaped structural component assumes the press fit with the carrier.

The sleeve-shaped structural components are of any desired shape. A further development of the invention provides that the sleeve-shaped structural component is of hollow-cylindrical design and open at the ends or closed at one end. The sleeve-shaped structural components are optionally pressed in or onto the carrier. The wall sections of the sleeve-shaped structural components close the indentations partially or completely and may also have a hole or several holes via which the indentations are accessible, for example, for oil through the structural component. The surface of the sleeve-shaped structural components forms complete or partial sealing surfaces against which the seals rest or run, or rolling surfaces on which rolling bodies roll. Alternatively, the structural components themselves may close or seal.

The sleeve-shaped structural components are preferably drawn of sheet steel with a wall thickness which is to the greatest extent as uniform as possible. However, at the wall section which covers the indentations or are to cover the indentations, the thickness of the drawn sheet metal is, according to the present invention, thicker than in the remaining axial and/or circumferential areas immediately adjacent the wall section.

The wall section protrudes at the non-assembled sleeve-shaped structural component over the area intended for the press connection, or the area facing away from the press seat, either inwardly and outwardly, or only outwardly or only inwardly by the dimension of the thicker wall thickness as compared to its surroundings. Preferably, the wall section protrudes by the amount of the thicker sheet steel thickness beyond the rear side of the wall of the sleeve-shaped structural component which contacts the carrier in the press connection.

The wall thickness, i.e., the thickness of the sleeve-shaped structural components is preferably 0.5 to 2.5 mm. The portion by which the thickness of the sheet metal of the wall section is thicker than the thickness of the adjacent areas of the structural component is advantageously between 5% to 20%, preferably 5% to 10% of the sheet metal thickness of the adjacent areas. Here, the wall section may have at least one through-hole or none. When drawing the sleeve-shaped structural component, the protruding portion forms in the deforming direction an undercut. This undercut yields because of small dimensions when removed from the mold, and resiliently returns into its initial position.

If the sleeve-shaped structural component is, for example, constructed hollow-cylindrically, the sleeve, because of the protruding portion/protruding portions of the sheet metal of the wall section, becomes intentionally non-round in these areas. This sleeve-shaped structural component is pressed directionally oriented on or in, such that the wall section in the final position of the structural component is to cover the corresponding indentation as intended. The sleeve-shaped structural component, as described in the chapter called "Background of the Invention", will partially yield into the indentation in the area of the indentation, wherein a radial portion of the sheet metal of the wall section dips into the indentation. The sheet metal of the wall section is therefore intended to be thicker by the dimension by which the wall section usually yields into the indentation. The structural component which is intentionally imprecisely constructed as an individual piece by way of the protruding portion, has in the pressed-in or pressed-on state on the back side of its wall which is participating in the press connection, the necessary accuracy, since the protruding portion has yielded into the indentation. Sealing seats, raceways and other functional surfaces become very accurate.

The press connection can be manufactured without additional expenses by the use of the sleeve according to the invention. The surrounding construction of the sleeve-shaped structural component can remain unchanged. The sleeve according to the invention is easily exchangeable against sleeves of the prior art.

BRIEF DESCRIPTION OF THE DRAWINGS

The present invention will be further understood and appreciated by reading the following description in conjunction with the accompanying drawings, in which.

DETAILED DESCRIPTION OF THE INVENTION

Figure 1:
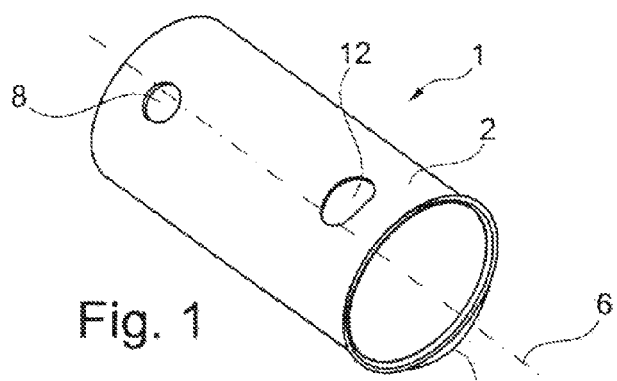
FIG. 1 illustrates a sleeve of the present invention.

FIG. 1 shows a sleeve-shaped component 1 of sheet metal in a perspective total view. The structural component 1 of sheet metal is a symmetrical sleeve 2 with a rotational axis 6.

Figure 2:
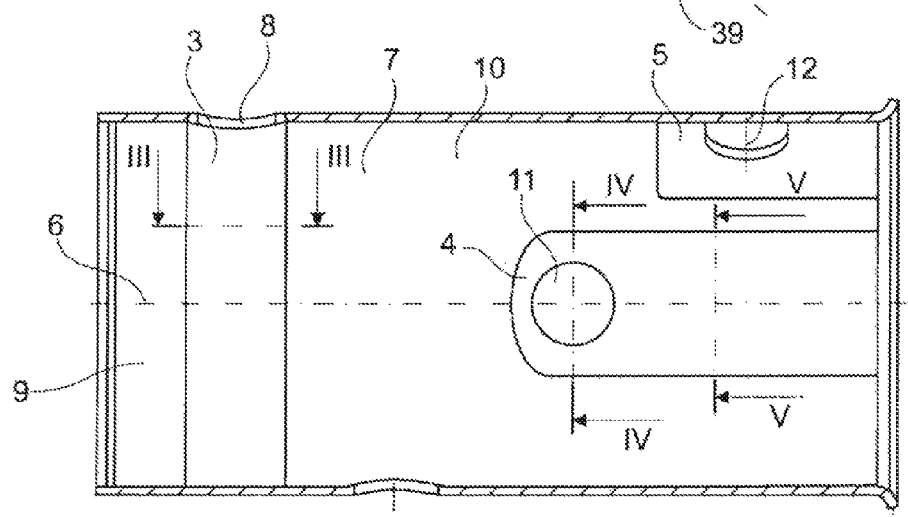
FIG. 2 illustrates a sectional view of the sleeve taken along an axis of rotation of the sleeve.

FIG. 2 shows the sleeve according to FIG. 1 in a longitudinal section along the rotational axis 6. The sleeve 2 has wall sections 3, 4 and 5 which differ from the remaining wall of the sleeve 2 by a wall thickness "T" which is greater than the wall thickness "D" of the remaining wall of sleeve 2.

Figures 3, 4, 5:
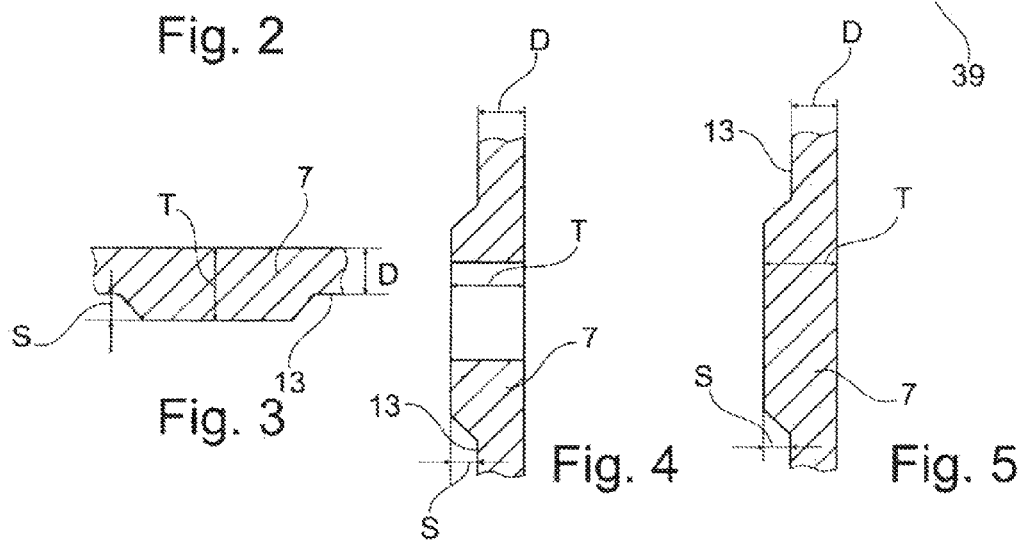
FIG. 3 illustrates a sectional view of the sleeve taken along line of FIG. 2.
FIG. 4 illustrates a sectional view of the sleeve taken along line IV-IV of FIG. 2.
FIG. 5 illustrates a sectional view of the sleeve taken along line V-V of FIG. 2.

The FIGS. 3, 4 and 5 each show a sectional view through the respective wall section 3, 4 and 5 and its surroundings, intersected at the respective line IV-IV or V-V not to scale and in exaggerated size. The wall thickness "T" of the sheet metal of the respective wall section 3, 4 or 5 is thicker by the dimension "S" than the thickness "D" of the sheet metal of the remaining wall 7 of the sleeve 2 which follows immediately adjacent the respective wall section.

The wall section 3 with the thickness "T" extends strip-shaped in the circumferential direction about the axis of rotation 6 in a closed manner. Sections 9 and 10 of the remaining wall 7 having the thickness "D" of the sleeve 2 are located adjacent on both sides axially of the sleeve 2. In the wall section, a throughhole 8 is formed.

The wall section 4 having the thickness "T", which may also be thicker or thinner than the thickness of the sheet metal at the wall section 3, is constructed strip-shaped and aligned longitudinally with the axis of rotation 6. On both sides in the circumferential direction about the axis of rotation 6 and in an axial direction, the section 10 of the remaining wall of the sleeve 2 is adjoining the wall section 4. In the wall section 4, a through hole 11 is provided.

The wall section 5 having the thickness "T", which may also be thicker or thinner than the thickness of the sheet metal at wall section 3 or 4, is constructed strip-shaped and is aligned longitudinally with the axis of rotation 6. On both sides in the circumferential direction about the axis of rotation 6 and in an axial direction, the section 10 of the remaining wall 7 of the sleeve 2 is adjoining the wall section 5. In the wall section 5, an oblong hole 12 is provided.

Figure 6:
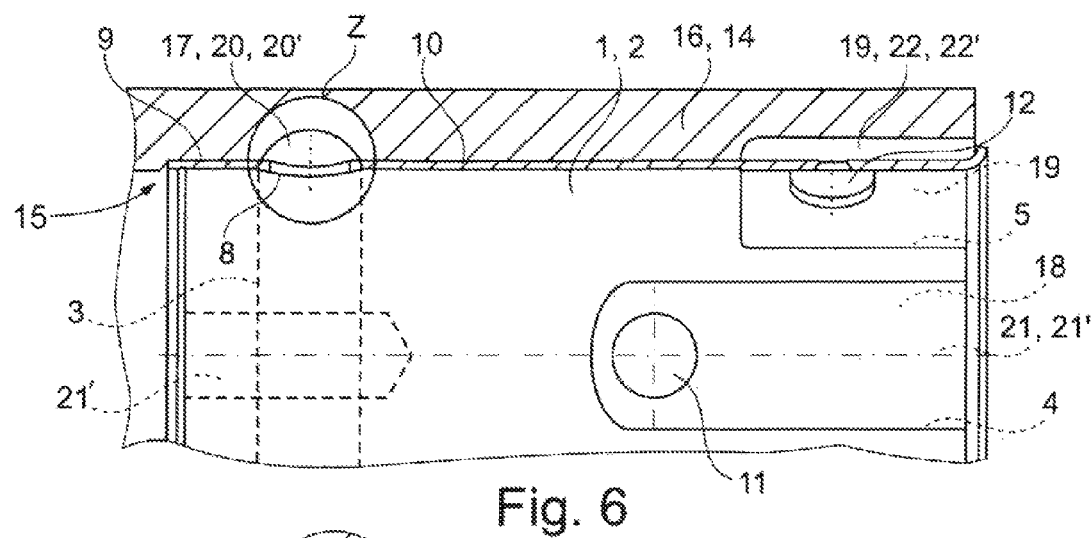
FIG. 6 illustrates a partial sectional view of a press-connection between the sleeve and a hollow shaft.

The portion "S", by which the thickness "T" of the sheet metal at the wall sections 3, 4 and 5 is thicker than the thickness "D" of the remaining wall sections 9 and 10, protrudes on the rear side 13 of the wall of the sleeve 2 which is provided for a press seat in a bore 15 with a hollow shaft 14 (FIG. 6). Since the sleeve 2 is pressed in, the rear side is formed by the inner side. If, on the other hand, the sleeve were provided for pressing on, this rear side would be the outer side of a sleeve. The sleeve 2 is additionally provided with a lug 39 which makes possible a directed assembly of the sections 3, 4 and 5 with the holes 8, 11 and 12 to form a carrier 16 in a press connection shown by way of FIG. 6.

FIG. 6 shows a press connection in accordance with the invention composed of a carrier 16 in the form of a hollow shaft 14 and the sleeve-like structural component 1 of sheet metal which is seated with a press seat at the carrier 16. At the surface of the inner side of the carrier 16, indentations 17, 18 and 19 are provided which are covered by a wall section 3, 4 or 5 each of the sleeve-shaped structural component 1 in the radial direction.

The indentation 17 is an annular groove 20 which is covered by the wall section 3, so that an annular duct 20' is delimited by the annular groove 20 and the wall section 3. The annular duct 20' is connected to a duct 21' aligned longitudinally in the form of a blind-end bore. The annular duct 20' is additionally accessible through the hole 8. Between the sleeve 2 and the carrier 16, a press seat is provided at the wall sections 9 and 10 on both sides of the annular groove 20.

The indentation 18 is a longitudinal groove 21 which is covered with the wall section 4, so that a duct 21' is delimited by the longitudinal groove 21 and the wall section 4. The duct 21' is accessible through the throughhole 11. Between sleeve 2 and carrier 16, a press seat is provided at the wall section 10 on both sides in the circumferential direction and axially at the end side.

The indentation 19 is a longitudinal groove 22 which is covered by the wall section 5, so that a duct 22' is delimited by the longitudinal groove 22 and the wall section 5. The duct 22' is accessible through the oblong hole 12. Between sleeve 2 and carrier 16 a press seat is provided at the wall section 10 on both sides in the circumferential direction and axially at the end side.

Figure 7:
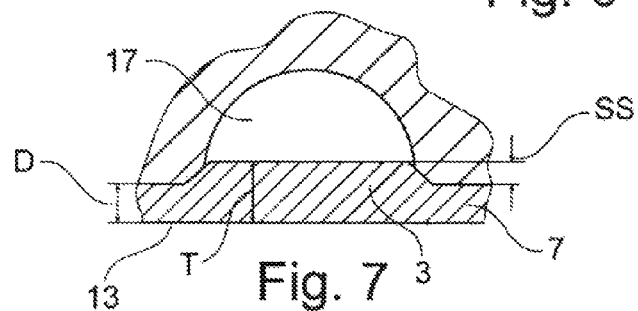
FIG. 7 illustrates an enlarged view of section Z of FIG. 6.

The portion "S", by which the thickness "T" of the sheet metal at the wall section 3, 4 and 5 is thicker than the thickness "D" of the remaining wall sections 9 and 10, after being pressed in no longer protrudes at the rear side 13 of the wall of the sleeve 2, but is immersed as portion "SS" into the respective indentations 17, 18 or 19, as in accordance with the example of FIG. 7, i.e., an enlarged view of section Z of FIG. 6 not to scale and in exaggerated size. The thickness "T" of the sheet metal of the respective wall sections 3, 4 or 5 is greater by the dimension "SS" than the thickness "D" of the sheet metal of the remaining wall. The dimension "SS", may correspond to the original dimension "S", but it does not have to.

Figure 8:
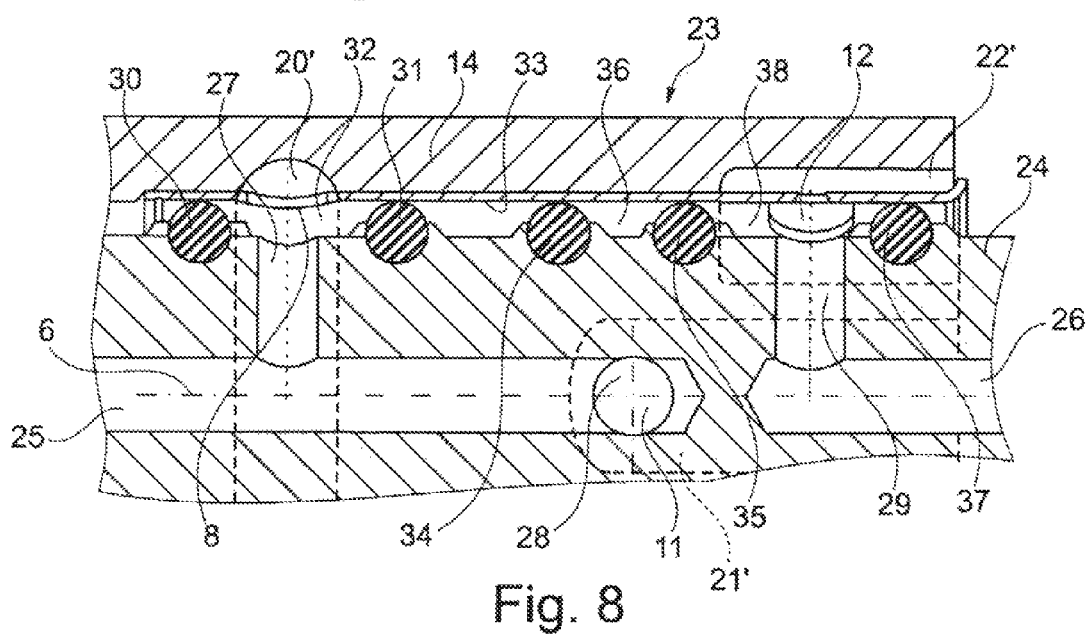
FIG. 8 illustrates a partial cross-sectional view of a media guide for a gear unit.

FIG. 8 shows a media guide 23 for a gear unit, not shown in detail, in a partial view along the axis of rotation 6. A plug-type shaft 24 is plugged into the hollow shaft 14. The plug shaft 24 has various supply ducts 25 and 26 with transverse ducts 27, 28 and 29. The entire inner side of the sleeve-shaped structural component is a sealing surface 33 for the seals in the form of O-rings 30, 31, 34, 35 and 37.

The O-rings 30 and 31 seal an annular space 32 and rest for this purpose against a sealing surface 33 of the sleeve 2. The annular duct 20' and the annular space 32 are connected to each other by way of the bore 8 and are supplied with oil via the transverse duct 27 extending from the supply duct 25.

The O-rings 34 and 35 seal an annular space 36 between the sleeve 2 and the plug shaft 24 and, for this purpose, are resting against the sealing surface 33. The annular space 36 is connected to the duct 21' by way of the throughhole 11 and is supplied with oil via the transverse duct 28 extending from the supply duct 25.

The O-rings 35 and 37 seal an annular space 38 between the sleeve 2 and the plug shaft 24 and, for this purpose, rest against the sealing surface 33. The annular space 38 is connected by way of the oblong hole 12 to the duct 22' and is supplied with oil via the transverse duct 29 extending from the supply duct 26.

Figure 9:
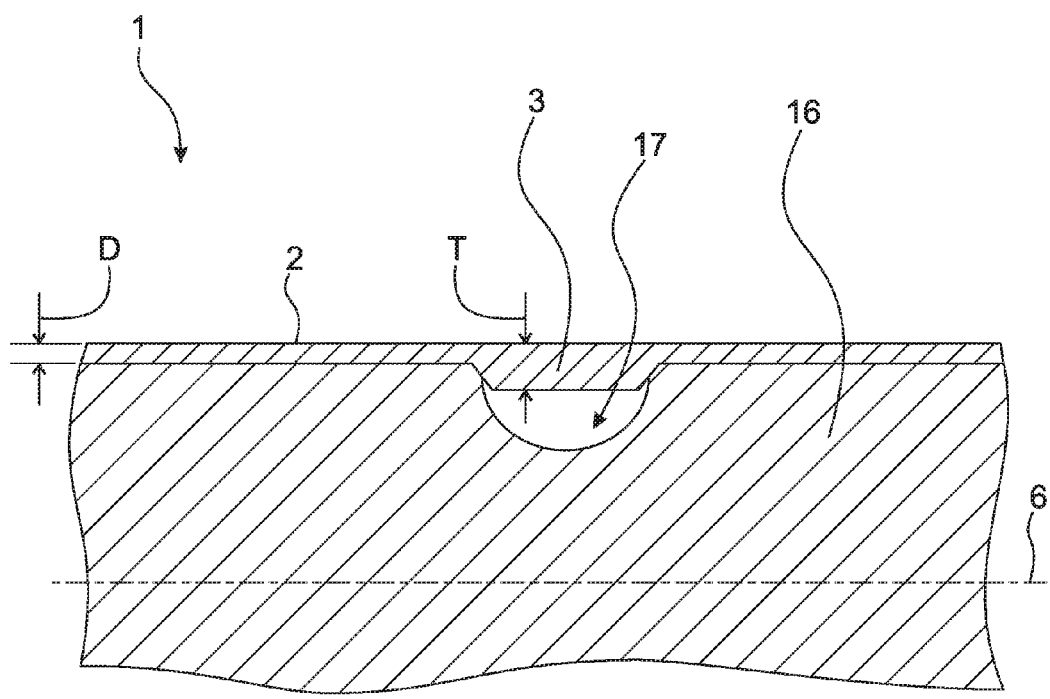
FIG. 9 illustrates a partial cross-sectional view of a press-connection between a sleeve and a carrier where the sleeve is arranged on the carrier.

FIG. 9 illustrates a partial cross-sectional view of a press connection including a carrier 16 in the form of a shaft and a sleeve-shaped structural component 1 of sheet metal which is seated with a press seat on the carrier 16. At the surface of the outer side the carrier 16, indentation 17 is provided which is covered by wall section 3 of the sleeve-shaped structural component 1 in the radial direction.

LIST OF REFERENCE NUMERALS

1 Sleeve-shaped component
2 Sleeve
3 Wall section
4 Wall section
5 Wall section
6 Axis of rotation
7 Wall
8 Hole
9 Section of the remaining wall
10 Section of the remaining wall
11 Throughhole
12 Oblong hole
13 Rear side
14 Hollow shaft
15 Bore
16 Carrier
17 Indentation
18 Indentation
19 Indentation
20 Annular groove
20' Annular duct
21 Longitudinal groove
21' Duct
22 Longitudinal groove
22' Duct
23 Media guide
24 Plug shaft
25 Supply duct
26 Supply duct
27 Transverse duct
28 Transverse duct
29 Transverse duct
30 O-ring
31 O-ring
32 Annular space
33 Sealing surface
34 O-ring
35 O-ring
36 Annular space
37 O-ring
38 Annular space
39 Lug

The invention claimed is:

1. A press connection, comprising:
a carrier having a surface with at least one indentation; and
at least one sleeve-shaped structural component formed from sheet metal and comprising an axially extending cylindrical wall;
wherein the cylindrical wall comprises:
a section with a first radial thickness; and,
at least one wall section comprising a second radial thickness greater than the first radial thickness, wherein:
the carrier comprises the at least one indentation prior to press-fitting the at least one sleeve-shaped structural component within the carrier;
the at least one indentation of the carrier is covered by the at least one wall section of the at least one sleeve-shaped structural component;
the at least one wall section is press-fit within the carrier at the at least one indentation; and
the at least one wall section has at least one hole which leads into the at least one indentation and is media-permeable with the at least one indentation.

2. The press connection of claim 1, wherein the at least one sleeve-shaped structural component is a hollow cylinder.

3. The press connection of claim 1, wherein at least the at least one sleeve-shaped structural component has a sealing surface against which at least one seal rests.

4. The press connection of claim 1, further comprising:
an axis of rotation, wherein the at least one sleeve-shaped structural component and the carrier are seated against each other in any axial or circumferential direction and the at least one wall section is aligned with the at least one indentation in a direction orthogonal to the axis of rotation.

5. The press connection of claim 1, wherein the sleeve-shaped structural component is a cylindrical sleeve having an axis of rotation, wherein a radial sheet metal thickness of the at least one wall section, which is cold formed, has at least a greater radial thickness than a radial thickness of the sheet metal of the cylindrical sleeve which adjoins the at least one wall section in both axial directions extending in alignment with the axis of rotation.

6. The press connection of claim 5, wherein the sheet metal of the at least one wall section is at least radially thicker than the sheet metal of the cylindrical sleeve which adjoins the at least one wall section in both circumferential directions about the axis of rotation.

7. A media guide in a gear unit which is formed at least partially by the carrier, the at least one sleeve-shaped structural component and at least one duct capable of conducting media between the carrier and the at least one sleeve-shaped structural component, wherein the at least one duct is formed by the at least one wall section of the at least one sleeve-shaped structural component and the at least one indentation and wherein the carrier and the at least one sleeve-shaped structural component enter into a press connection of claim 1.

8. A press connection, comprising:
a carrier including a surface facing a rotational axis and having an indentation; and, a separately formed sleeve-shaped structural component formed from sheet metal and locatable within the carrier, the sleeve-shaped structural component including an axially extending cylindrical wall, the axially extending cylindrical wall including, prior to assembly with the carrier:
a first wall section having a first wall thickness; and,
a second wall section having a second wall thickness, smaller than the first wall thickness;
wherein, after assembly with the carrier:
the indentation is at least partially covered by the first wall section;
the sleeve-shaped structural component is in a press fit with the carrier at the second wall section; and,
an amount of the first wall section is disposed within the indentation and the amount is equal to a difference between the first and second wall thicknesses.

9. The press connection of claim 8, wherein:
the axially extending cylindrical wall includes a throughhole; and,
the throughhole is aligned with the carrier in a radial direction orthogonal to the rotational axis.

10. The press connection of claim 9, wherein the throughhole is aligned with the indentation in the radial direction.

11. The press connection of claim 8, further comprising:
a shaft located within the axially extending cylindrical wall.

12. A press connection of claim 11, further comprising:
a seal sealed against the axially extending cylindrical wall and the shaft.

13. The press connection of claim 8, wherein the axially extending cylindrical wall includes a constant inner diameter.

14. A press connection, comprising:
a carrier including a surface facing a rotational axis and having an indentation; and,
a separately formed sleeve-shaped structural component formed from sheet metal and locatable on the carrier, the sleeve-shaped structural component including an axially extending cylindrical wall, the axially extending cylindrical wall including, prior to assembly with the carrier:
a first wall section having a first wall thickness; and,
a second wall section having a second wall thickness, smaller than the first wall thickness;
wherein, after assembly with the carrier:
the indentation is at least partially covered by the first wall section;
the sleeve-shaped structural component is in a press fit with the carrier at the second wall section; and,
an amount of the first wall section is disposed within the indentation and the amount is equal to a difference between the first and second wall thicknesses.

15. The press connection of claim 14, wherein the sleeve-shaped structural component is a hollow cylinder.

16. The press connection of claim 14, wherein the axially extending cylindrical wall includes a throughhole which is aligned with the indentation in the radial direction.

17. The press connection of claim 14, further comprising a seal sealed against the axially extending cylindrical wall and a shaft.

18. The press connection of claim 14, wherein the first wall thickness is between 5-20 percent thicker than the second wall thickness.

19. The press connection of claim 14, wherein the axially extending cylindrical wall includes a constant outer diameter.

* * * * *